United States Patent [19]

Breda

[11] 4,019,857
[45] Apr. 26, 1977

[54] PROCESS FOR THE COLORATION OF HYDROPHOBIC CHEMICAL FIBERS BY METALLIFEROUS DYESTUFFS OF CATIONIC CHARACTER

[75] Inventor: Antoine Georges Leon Jacques Breda, Bois Guillaume, France

[73] Assignee: Produits Chimiques Ugine Kuhlmann, Paris, France

[22] Filed: Mar. 11, 1974

[21] Appl. No.: 450,112

[30] Foreign Application Priority Data

Mar. 20, 1973 France .............................. 73.09880

[52] U.S. Cl. ..................................... 8/42 C; 8/1 C; 8/1 D; 8/42 R; 8/172 R; 8/173; 260/146 R; 260/149

[51] Int. Cl.² .................. C09B 29/38; C09B 29/00; D06P 1/13; D06P 1/02

[58] Field of Search ................... 8/42 R, 42 C, 173; 260/172, 147, 149, 150, 151

[56] References Cited

UNITED STATES PATENTS

| 3,040,020 | 6/1962 | Pütter | 260/147 |
|---|---|---|---|
| 3,316,238 | 4/1967 | Hanke | 260/146 |
| 3,375,240 | 3/1968 | Beffa | 260/145 |
| 3,417,074 | 12/1968 | Kühne | 260/151 |
| 3,538,073 | 11/1970 | Mack | 260/146 |
| 3,728,328 | 4/1973 | Lienhard | 260/147 |

FOREIGN PATENTS OR APPLICATIONS

| 812,151 | 4/1959 | United Kingdom | 260/151 |

*Primary Examiner*—Christopher A. Henderson, Jr.
*Attorney, Agent, or Firm*—Beveridge, DeGrandi

[57] ABSTRACT

Process for dyeing or printing synthetic or artificial hydrophobic textile fibers in an aqueous medium with a 1:1 premetallized dyestuff complex of monocationic character of a transition metal, the cationic part of which dyestuff does not contain an ionized group (dyestuff (I)), in which the fibers are treated at a temperature at least equal to 80° C. with a complexing agent (III), sparingly soluble in water and not containing an ionized group and more soluble in the fiber than in the aqueous dyeing medium of pH from 3 to 7, and with the premetallized dyestuff (I), the complexing agent being capable of fixation on the metal of the premetallized dyestuff with liberation of a proton, and synthetic or artificial hydrophobic textile fibers dyed or printed by such process.

17 Claims, No Drawings

PROCESS FOR THE COLORATION OF HYDROPHOBIC CHEMICAL FIBERS BY METALLIFEROUS DYESTUFFS OF CATIONIC CHARACTER

The present invention relates to a process for dyeing or printing synthetic or artificial hydrophobic textile fibres by means of premetallised dyestuffs.

It is known to dye fibres based on polyesters by means of water-insoluble dyestuffs introduced in to an aqueous dyebath in the form of a fine dispersion. It is however, difficult to obtain very dark shades in this way, and the dyeings thus effected often have an imperfect fastness to sublimation.

It is also known to treat polyester fibres with organosoluble complexes of the transition metals, before or after dyeing these fibres with azo dyestuffs of metallisable structure. The shades obtained on the fibres by this metallisation operation generally become darker, but it is difficult to obtain in this way a regular and uniform fixation of the metal on the dyestuff.

Premetallised dyestuffs of a neutral or anionic character have also already been prepared and hydrophobic fibres have then been dyed with these dyestuffs, but in such case the dyeing conditions are generally difficult in so far as relatively long periods at relatively high dyeing temperatures are concerned, and the exhaustion of the bath is often only mediocre.

It has now been found that the above disadvantages may be reduced or suppressed and that synthetic or artificial hydrophobic fibres, especially those based on polyesters or cellulose triacetate, may be dyed by means of premetallised dyestuffs in shades which can go up to the darkest shades, with a good exhaustion of the bath, an excellent levelling and an exceptional fastness to sublimation.

According to the present invention a process is provided for dyeing or printing synthetic or artificial hydrophobic textile fibres in aqueous medium with a 1:1 premetallised dyestuff complex of monocationic character of a transition metal, the cationic part of which dyestuff does not contain an ionised group (dyestuff (I)), in which treatment of the fibres is carried out at a temperature at least equal to 80° C. with a complexing agent (III) sparingly soluble in water and not containing an ionised group, and more soluble in the fibre than in the aqueous dyeing medium of pH between 3 and 7, and with the premetallised dyestuff (I), the complexing agent being capable of fixation on the metal of the premetallised dyestuff with liberation of a proton.

The treatment of the hydrophobic fibres may for example be carried out either in two successive stages, the first of which comprises the impregnation of the fibre with the complexing agent (III) and the second comprises the dyeing of the fibre coming from the first stage with the dyestuff (I) in the presence of water, or in a single stage comprising the simultaneous treatment of the fibre with the complexing agent (III) and the premetallised dyestuff (I).

By ionised group is to be understood groups such as, for example, $-SO_3H$, $-COOH$, and groups containing a quaternary nitrogen atom.

The complexing agents (III) are preferably represented by the formula V—H, V$^-$ representing the anionic residue of the molecule of complexing agent resulting from the loss of a proton. This complexing agent can act as a bidentate chelating agent which is sparingly soluble in water and can form with the metal of the dyestuff (I) a five- or six-membered ring. The expression sparingly soluble in water is to be understood as referring to products having a solubility in water at 20° C. less than 10 grams per liter.

The hydrophobic textile fibres may for example be based on polyacrylonitrile, but are preferably based on polyesters or cellulose triacetate. The invention may be applied to these two latter particularly hydrophobic types of fibres with special advantage.

The complexing agent may for example have a structure corresponding to one of the following formulae:

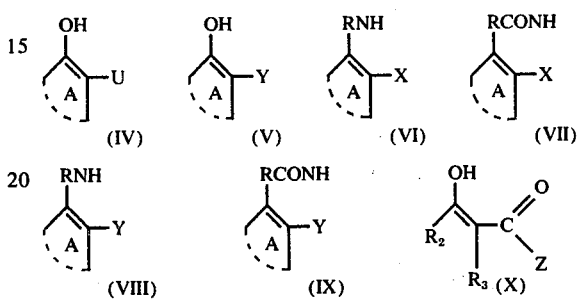

in which A represents a benzene or naphthalene nucleus or a heterocyclic ring with 5 or 6 members, X represents OH, NHR, NHCOR, OR, NRR', or halogen, Y represents $NO_2$, —CHO, COR, COOR, or CONRR', U represents NHR, NHCOR, OR, NRR', or halogen, A may carry up to three halogen, alkyl or alkoxy substituents in addition to the substituents illustrated (the alkyl and alkoxy preferably contain 1 to 4 carbon atoms), R and R' may be the same or different and each represents a hydrogen atom or a substituted or unsubstituted alkyl or aryl radical, (the alkyl preferably contains 1 to 4 carbon atoms and the aryl is preferably phenyl) the radicals NRR' or CONRR' may form part of a heterocyclic ring in the formation of which N, R and R' participate, Z is R, OR or NRR', the substituents $R_2$ and $R_3$ have the same significance as R and R', —$R_2R_3$— or $R_3Z$— may form part of a carbocyclic or a heterocyclic ring and $R_3$ may represent a halogen atom.

As examples of complexing agents (III) according to the various structures above there may be mentioned the following compounds:

For structure (IV): 3,4,6-trichloro-2-amino-phenol; 6-chloro-4-nitro-2-amino-phenol, 2,4,6-trichlorophenol, 2-chloro-5-methyl-phenol or 2-chloro-4-nitro-phenol.

Structure (V): 1-nitro-2-naphthol or 2-nitro-1-naphthol, 4-chloro-, 4-methyl-, or 6-methyl-2-nitro-phenol, salicylaldehyde, 5-chloro-, 3,5-dichloro-, 3-chloro-5-methyl-, 3,5-dimethyl, or 4,5-dimethyl-2-hydroxy-benzaldehyde, 5-methoxy-2-hydroxybenzaldehyde, 2-hydroxy-1-naphthaldehyde, 2-acetyl-1-naphthol, 2-hydroxy-, 2-hydroxy-4-methoxy-benzophenone, methyl-, ethyl-, propyl- or butyl-salicylate or methyl salicylate, 5-chloro- or 5-bromo-2-hydroxy methyl or ethyl benzoate, methyl or ethyl dimethyl-salicylate, 2-hydroxy-3-methyl-benzamide.

Structures (VI) and (VII): 2-chloro-5-methyl-aniline; 2-methoxy-5-methyl-aniline; 2,6-dichloro-4-nitro-aniline; 4-chloro- or 5-chloro-2-methoxy-acetanilide; 2,5-dichloro-acetanilide.

Structures (VIII) and (IX): 2,4-dimethyl-, 2-methyl-, or 4-chloro-6-nitro-aniline; 2-nitro-4-chloro-acetanilides; butyl anthranilate; ethyl-4-chloro anthranilate;

o-amino-sulphonic acid diethylamide; 3,5-dicarbethoxy-2-amino-4-methyl-thiophene; 8-chloro- or 5,8-dichloro-1-amino-naphthalene.

Structure (X): benzoylacetone; ethyl benzoyl acetate; benzyl or cyclohexyl acetylacetate; 4-chloro-, 2,4-dichloro-2-methyl-4-chloro or N-methyl-anilide of 3-keto-butanoic acid; 2-formyl- or 2-acetyl-cyclohexanone; 2-formyl or 2-acetyl-butrolactone; or 2-carbethoxy-cyclopentanone.

Complexing agents (III) which may also be mentioned are compounds containing a hydroxyl group and an oxygen atom linked to two adjacent carbon atoms, and able to form by chelation a ring of five atoms such as tropolone and the derivatives of hydroxyacetic acids. The following are examples of such compounds: tropolone, 3-methyl-tropolone, benzoin, and 2-hydroxy-3-methyl-2-cyclopentene-1-one.

According to a particular form of the invention, the complexing agents (III) before dyeing or printing may be heat-fixed on the fibres at a temperature from 80° C. to 250° C. after steaming or impregnation of the textile material with the said compounds. The latter may be used in the pure state or in the form of concentrated aqueous emulsion or suspension or in the form of a solution in a volatile solvent.

They can also be caused to penetrate into the fibres in the course of the dyeing or printing treatment. It is then advantageous to emulsify the compounds (III) in the dyeing or printing bath by means of a surface-active agent not having any chelating power with respect to the dyestuff (I) and having preferably an anionic character, such as for example the alkali metal salts of sulphated ricinoleic or succinic esters.

Within the scope of the process of this invention a carrier without any chelating power towards the dyestuff (I) and without surface-active properties may also be added to the above-mentioned surface-active agent. Such carriers, for example, orthodichlorobenzene are already known in the dyeing of polyesters The preferred complexing agents (III) are substances of aromatic character disubstituted in the ortho positions by complexing groups, or substances capable of providing a ketoenol structure, and more particularly aromatic ortho-hydroxyaldehydes sparingly soluble in water, such as for example 2-hydroxy-naphthaldehyde, or methyl-, dimethyl-, chloro- or methyl- chlorosalicylaldehyde.

The process of the invention is advantageously carried out at a temperature at least equal to 80° C., generally from 80° C. to 250° C. and more especially from 90° C. to 130° C.

The transition metal selected for the dyestuff (I) may be, for example, divalent copper or trivalent cobalt or preferably trivalent chromium.

According to the invention an azomethine or preferably an azo dyestuff (I) may be used with particular advantage.

According to a specially favourable form of the invention the dyestuff (I) has the general formula:

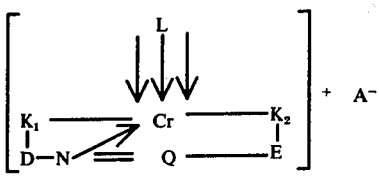

(II)

in which N is nitrogen, Q represents a nitrogen atom or a methine group, D and E each represent a radical not containing an ionic grouping and having an aromatic, heterocyclic or aliphatic character, this radical carrying in the vicinal position with respect to the grouping —N=Q— a chelating group $K_1$ or $K_2$, Cr is trivalent chromium, $K_1$ represents —O— or —COO—, $K_2$ represents —O— or —NR—, R being an alkyl or aryl substituent or a hydrogen atom, L represents a group of 3 neutral monodentate ligands or of a neutral bidentate ligand and a neutral monodentate ligand, or a neutral tridentate ligand, and A represents a simple anion carrying one negative charge. D and E may each for example represent benzene, naphthalene, pyrazole or pyrazolone nuclei or an acetoacetanilide residue or derivative thereof. E may also represent a tetrahydronaphthalene nucleus. D and E may each also, for example, be substituted by up to two nitro, hydroxy, halogen, phenyl or alkyl or alkoxy substituents (the alkyl and alkoxy each preferably containing 1 to 4 carbon atoms). Water, ammonia and pyridine are examples of an electrically neutral monodentate ligand.

By simple anion carrying one negative charge is meant an anion with a single charge such as for example chloride, hydroxyl, acetate, formate or the fraction of the ion corresponding to a single charge, such as for example, sulphate, phosphate, this anion being free from colouring properties.

The dyestuffs (1) used in the process of the invention, if they are not sufficiently soluble, can be applied in a dispersed form.

The dyeings or prints obtained according to the invention are marked by full-bodied colourations showing good general fastness, and especially a remarkable resistance to sublimation. By way of example, the fibres based on polyesters dyed by the new process may be heated almost up to the melting temperature of the fibres without the dyestuff subliming to an appreciable extent.

The process of the invention may also be applied at a temperature not exceeding 100° C. to polyester fabrics modified by anionic groups such as Dacron 64 or Fortrel.

The invention also relates to the artificial or synthetic textile fibres dyed or printed by the process described above.

The invention is illustrated by the following Examples in which the parts are parts by weight.

EXAMPLE 1

A chroming solution obtained after heating for two hours at 115° C. a mixture in 1125 parts of ethyleneglycol of 290 parts of chromic chloride hexahydrate and 900 parts of paste corresponding to 334 parts of the pure monoazo dyestuff formed with diazotised picramic acid and hydroquinone monomethyl ether, gives on dilution in 4000 parts of brine a precipitate which is filtered off and finely divided by grinding in sand.

15 parts of the fluid paste thus obtained, corresponding to 2.5 parts of dry product and to 1.4 parts of the pure monoazo starting dyestuff, are dispersed in 1500 parts of water containing 6 parts of 3,5-dimethyl-2-hydroxy benzaldehyde emulsified with 1 part of sulphated diheptyl succinate. The dyebath thus made and well agitated enables 100 parts of Tergal fibres to be dyed in an autoclave by raising the temperature progressively to between 100° C. and 130° C. in an hour. The textile material is then stripped by stirring in a bath at 60° C. containing 1 part of sodium hydroxide and 1 part of sodium hydrosulphite to 1000 parts of water.

A dyeing of a dark green to black shade is thus obtained which is very fast to light and sublimation.

A slightly less deep colouration is obtained by replacing the 3,5-dimethyl-2-hydroxy-benzaldehyde by an equal quantity of 3,5-dichloro-salicylaldehyde, or 3-chloro-5-methyl-salicylaldehyde, or again by 8 parts of a mixture of equal parts of 2-hydroxy-1-naphthaldehyde and o-dichloro-benzene.

EXAMPLES 2 TO 15

The Table below gives Examples of other dyestuffs (I) preferred in the process of the invention:

| Example | Monoazo dyestuff Diazotisation component | Coupling component | Shade of the 1/1 chromium complex on polyesters |
|---|---|---|---|
| 2 | picramic acid | tetrahydro-beta-naphthol | green-brown |
| 3 | picramic acid | para-cresol | brown |
| 4 | picramic acid | N,N-dimethyl-meta-amino-phenol | violet |
| 5 | picramic acid | 3,4-dimethyl-phenol | brown |
| 6 | 4-nitro-2-amino-phenol | beta-naphthol | corinth |
| 7 | 4-nitro-2-amino-phenol | 4-methyl-1-naphthol | black |
| 8 | 4-nitro-2-amino-phenol | hydroquinone mono-ethyl ether | reddish black |
| 9 | 5-nitro-2-amino-phenol | beta-naphthol | sea blue |
| 10 | 5-nitro-2-amino-phenol | 1-phenyl-3-methyl-5-pyrazolone | bluish red |
| 11 | 4,6-dichloro-2-amino-phenol | beta-naphthol | violet |
| 12 | 4,6-dichloro-2-amino-phenol | 4-methyl-1-naphthol | blue |
| 13 | 4,6-dichloro-2-amino-phenol | 1-phenyl-3-methyl-5-pyrazolone | orange red |
| 14 | anthranilic acid | 1-phenyl-3-methyl-5-pyrazolone | yellow |
| 15 | anthranilic acid | acetoacetanilide | yellow |

What we claim is:

1. A process for dyeing or printing synthetic or artificial hydrophobic textile fibers based on polyesters or cellulose triacetate in an aqueous medium containing a dyestuff having the formula:

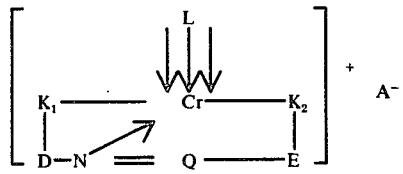

in which N is nitrogen,
Q represents a nitrogen atom or a methine group,
D and E each represent a radical not containing an ionic group and having an aromatic, heterocyclic or aliphatic character, this radical carrying in the vicinal position with respect to the grouping —N=Q— a chelating group $K_1$ or $K_2$;
Cr is trivalent chromium;
$K_1$ represents —O— or —COO—;
$K_2$ represents —O— or —NR—;
R being an alkyl or aryl substituent or a hydrogen atom;
L represents a group of 3 neutral monodentate ligands, or neutral bidentate ligand and a neutral monodentate ligand, or a neutral tridentate ligand; and
A represents a simple anion carrying one negative charge, the cationic part of which dyestuff does not contain an ionized group,
which process comprises contacting said fibers with an aqueous dyeing medium at a pH of 3 to 7 and a temperature at least equal to 80° C containing a complexing agent sparingly soluble in water and not containing an ionized group and more soluble in the fiber than in the aqueous dyeing medium, and with the premetallized dyestuff;
said complexing agent being capable of fixation on the metal of the premetallized dyestuff with liberation of a proton and of chelating agent forming a five- or six-membered ring with the chromium of the dyestuff complex thereby rendering it neutral.

2. The process according to claim 1 in which the fibres are subjected to a treatment in two successive stages the first of which comprises the impregnation of the fibre with the complexing agent and the second comprises the dyeing or printing of the fibre produced from the first stage with the dyestuff (I).

3. The process according to claim 1 in which the fibres are treated simultaneously with the complexing agent and the premetallized dyestuff.

4. The process according to claim 1 in which before dyeing or printing, the complexing agent is heat-fixed on the hydrophobic textile fibre at a temperature from 80° C. to 250° C. after steaming or impregnation of the fibre with the complexing agent.

5. The process according to claim 1 in which the complexing agent is emulsified in the dyebath or printing bath by means of at least one surface-active agent which has no chelating power with respect to the dyestuff (I) and has an anionic character.

6. The process according to claim 1 in which the complexing agent is an aromatic substance substituted in the two ortho positions by complexing groups or a substance capable of providing a keto-enol structure.

7. The process according to claim 1 in which the complexing agent is an aromatic ortho-hydroxy-aldehyde sparingly soluble in water.

8. The process according to claim 1 in which the treatment of the fibres is carried out at a temperature of from 80° C. to 250° C.

9. The process according to claim 1 in which the treatment of the fibres is carried out at a temperature of from 90° C. to 130° C.

10. The process according to claim 1 in which the dyestuff is an azo dyestuff.

11. The process according to claim 1 wherein D represents a benzene or naphthalene nucleus.

12. The process according to claim 1 wherein E represents a benzene, naphthalene, tetrahydronaphthalene, pyrazole or pyrazolone nucleus or an acetoacetanilide residue or a derivative thereof.

13. The process according to claim 1 wherein D is substituted by up to two nitro, hydroxy, halogen, phenyl, alkyl or alkoxy substituents.

14. The process according to claim 13 wherein any alkyl or alkoxy substituent contains 1 to 4 carbon atoms.

15. The process according to claim 1 wherein E is substituted by up to two nitro, hydroxy, halogen, phenyl, alkyl or alkoxy substituents.

16. The process according to claim 15 wherein any alkyl or alkoxy substituent contains 1 to 4 carbon atoms.

17. The process according to claim 1 in which the neutral monodentate ligand is water, ammonia or pyridine.

* * * * *